Jan. 18, 1944.  S. W. WEBSTER  2,339,535
HYDROMATIC BRAKE ARRANGEMENT
Filed Jan. 5, 1942  2 Sheets-Sheet 1
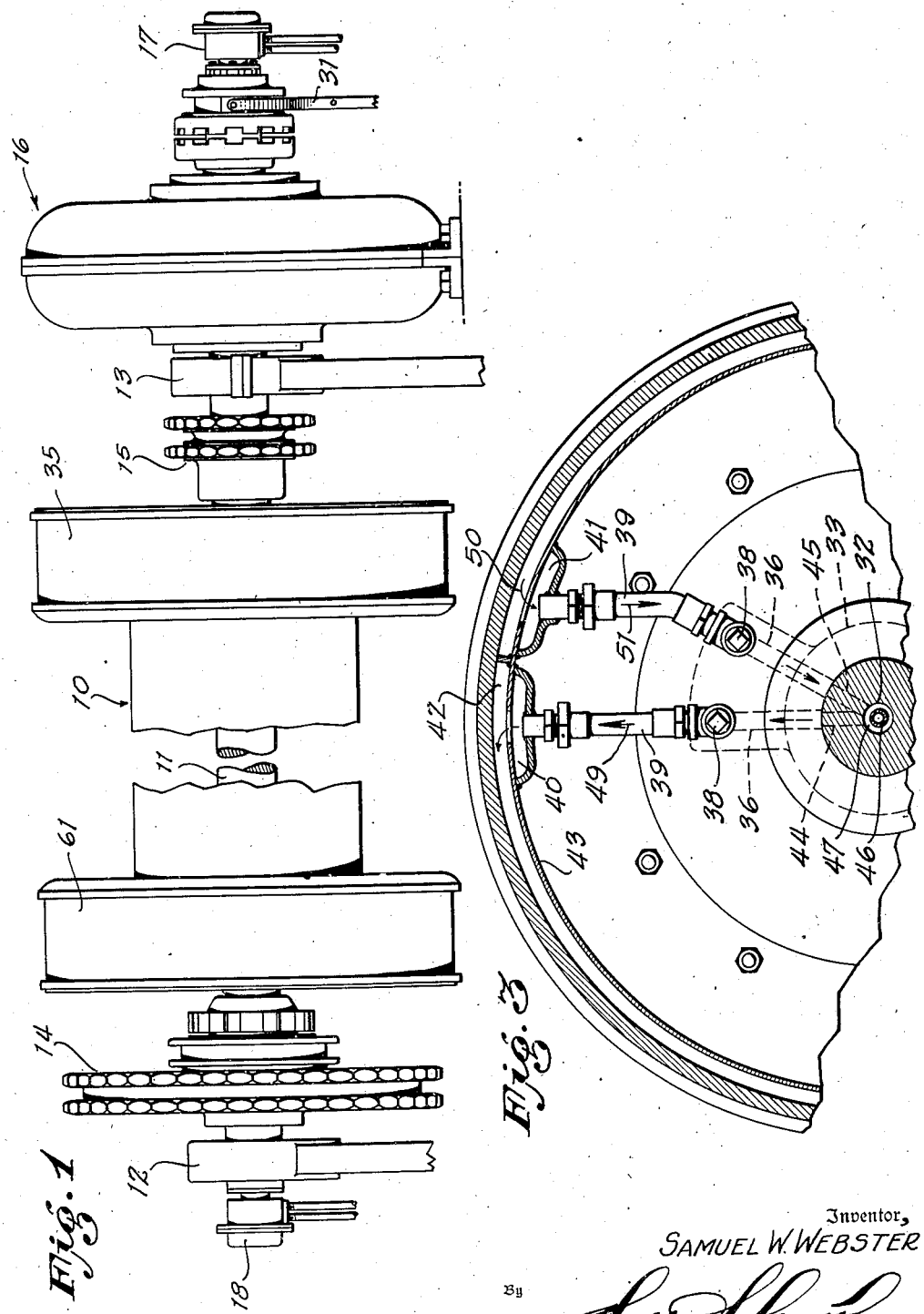
Inventor,
SAMUEL W. WEBSTER
By
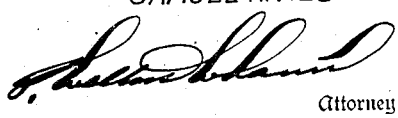
Attorney

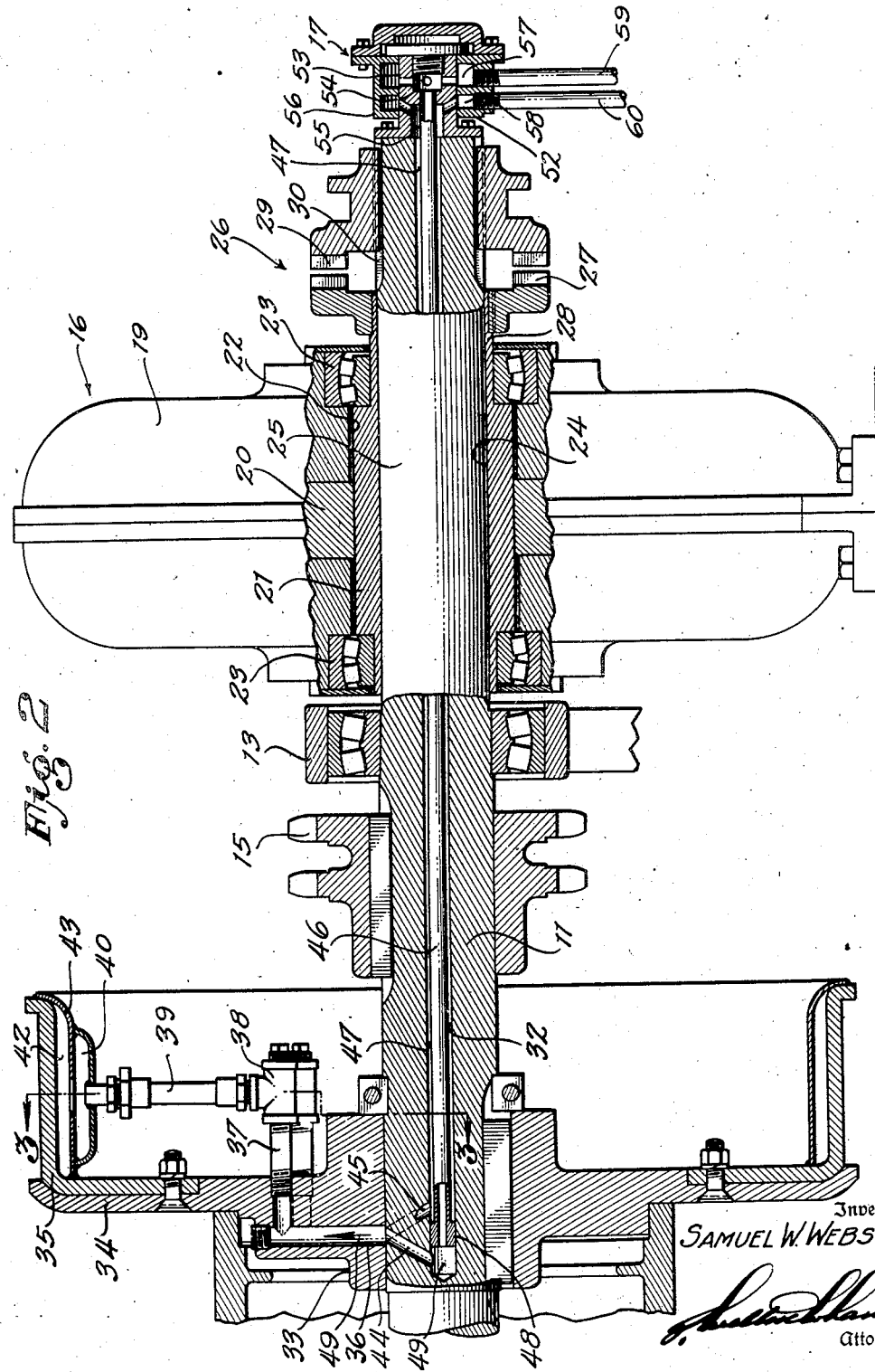

Patented Jan. 18, 1944

2,339,535

UNITED STATES PATENT OFFICE 2,339,535

HYDROMATIC BRAKE ARRANGEMENT

Samuel W. Webster, Dallas, Tex., assignor to Emsco Derrick & Equipment Company, Los Angeles, Calif., a corporation of California Application January 5, 1942, Serial No. 425,657

1 Claim. (Cl. 254—187)

My invention relates in general to drawworks such as used in rotary well drilling equipment, and relates in particular to means whereby the space required for an auxiliary brake mechanism, such, for example, as a hydromatic brake, may be minimized, and further relates to a simple means for supplying fluid to a mechanism associated with the drum and its shaft.

So that the importance of the present invention may be better understood, a few of the characteristics of rotary drawworks as now used will be referred to. In modern drawworks, rotation controlling means are employed adjacent the ends of the cable drum, such means generally comprising large friction brakes. The severe service conditions under which these brakes are used in deep well drilling makes water cooling of the brake drums an accepted requirement. To minimize wear on these friction brakes by relieving them of certain types of service, a fluid actuated brake, referred to as the hydromatic brake, is now employed in heavy drawworks, such fluid actuated brake being used for the purpose of absorbing power generated in the running of a string of drill pipe into the well. This fluid actuated brake has its own shaft which is disposed in axial alignment with the drum shaft, and a clutch is placed so as to connect the ends of the drum shaft to the shaft of the fluid actuating brake. To conduct the cooling water to the rims of the friction brakes, or to at least one of them, it has been proposed to provide the shaft of the fluid actuated brake with an axial opening from end to end thereof, and to extend a water tube through this axial opening and the interconnecting clutch, thus tube connecting with an opening in the drum shaft which is in turn connected through suitable passages with the water spaces of the friction brake. A number of difficulties in modern drawworks have resulted from disalignment of the drum and auxiliary brake shaft and also from excessive lengths of the drawworks structure due to the assembly of cooperating parts in end to end relation.

It is an object of my present invention to provide a rotary drawworks of the general character hereinabove described, wherein the overall length of the drawworks is materially reduced and axial alignment of the cooperating parts may be assured under operating conditions without the necessity of extensive reenforcing of the drawworks frame which becomes necessary as the length of the drawworks structure is increased.

A further object of the invention is to provide a simplified means for enabling the employment of both a fluid utilizing rotation controlling device, such, for example, as a friction brake having a drum and a brake band, and an auxiliary braking device of the fluid actuated type adjacent one end of the brake drum of the rotary drawworks device and wherein the fluid brake may be selectively connected to and disconnected from the drawworks shaft, these desired results being achieved in a simplified arrangement and with a minimum number of parts.

A further object of the invention is to provide a drawworks structure in general corresponding to accepted practice in the provision of a cable drum, band brake means therefor, a shaft to support the drum, and means for transmitting power to the shaft and the drum, and wherein the shaft has a projecting end portion of minimum length, which end portion projects through a bore provided in the rotor element of a fluid brake or power absorbing device which is placed close to the bearing supporting the end of the shaft, with the clutch means for connecting the rotor with the shaft placed on the far side of the fluid brake or power absorbing device.

It is also an object of the invention to provide in this device means whereby fluid may be conducted through an axial opening in the shaft by use of a simple tubular conduit and with a minimum number of packing devices, this result being made possible by the arrangement of the fluid braking device in a position surrounding a portion of the drum shaft so that the end of the drum shaft is exposed for attachment of a swivel connection to the tubular fluid conveying member.

It is an object of the invention to provide in a structure of the character set forth in the preceding paragraph means for forming within an axial opening in the drum shaft a plurality of ducts through which fluid may be moving in different directions as required in the operation of the device, these results being likewise accomplished in a simple manner.

Further objects and advantages of the invention will be brought out in the following part of the specification.

Referring to the drawings which are for illustrative purposes only,

Fig. 1 is a view showing a drum shaft assembly of a drawworks embodying my invention.

Fig. 2 is an enlarged fragmentary sectional view of the rightward end of Fig. 1, to show the internal fluid passages.

Fig. 3 is a fragmentary section taken as indicated by the line 3—3 of Fig. 2.

Since my present invention is concerned only with the mechanism employed in axial alignment with the drum of the hoisting device, Fig. 1 shows only a drum shaft assembly of a drawworks, but it will be understood that this drawworks includes a supporting frame with the customary line shaft and jack shaft with associated chain and sprocket drive means. This assembly includes a drum 10 fixed on a shaft 11, spaced bearings 12 and 13 for support of the shaft, low and high speed sprockets 14 and 15 disposed on the shaft at opposite ends of the drum 10, a fluid brake 16 of the type commonly referred to as a hydromatic brake, and means 17 and 18 for conveying fluid for purposes which will be hereinafter described.

As shown in Fig. 2, the auxiliary braking device 16 has a shell 19 which comprises the stator element of the device. Within this stator 19 there is a rotor 20 having a short shaft 21 as its support. This shaft 21 is supported in a coaxial bore 22 in the stator 19 by means of bearings 23, and the shaft 21 has from end to end thereof a coaxial bore 24 through which projects the rightward end portion 25 of the drum shaft 11. It will be noted that the leftward or near face of the auxiliary braking device is close to the adjacent part which surrounds the shaft, namely, the bearing 13. Clutch means 26 is provided for connection of the drum shaft 11 to the shaft 21 of the braking device 16.

The clutch 26 is shown as being of jaw type, with a jaw member 27 fixed upon a tubular or annular projection 28 which extends from the far end of the hollow shaft 21. To cooperate with the jaw member 27, a clutch jaw 29 is supported on the extremity of the projecting portion 25 of the shaft 11 and interengaging splines 30 permit axial sliding movement of the clutch member 29 on the shaft 11, to transmit rotation from the shaft 11 to the clutch 29, which rotation is in turn transmitted to the clutch member 27 when the parts 27 and 29 are engaged as the result of leftward movement of the clutch member 29 through operation of customary means such as a clutch operating yoke 31, Fig. 1.

An axial opening 32 extends into the drum shaft 11 from the rightward end thereof to a point within the hub 33 at the rightward end of the drum 10, this hub 33 having a radial wall 34 which supports a brake drum 35. The hub 33 has therein two radial passages 36 which are connected by pipes 37, fittings 38, and tubular connections 39 with inlet and outlet chambers 40 and 41 communicating, as shown in Fig. 3, with an annular water chamber 42 formed within the drum 35 by a wall 43. Axially spaced passages or ports 44 and 45 in the drum shaft 11 connect the axial passages 32 with the inner ends of the radial passages 36.

A water conveying tube 46 is extended through the axial passage 32. This tube 46 has an external diameter smaller than the diameter of the passage 32 so as to provide therearound a water return passage 47. At the inner end of the tube 46 there is a collar or head 48 positioned between the inner ends of the ports 44 and 45, and forming a barrier in the passage 32 between the inner ends of the ports 44 and 45, so that water which is passed inwardly through the tube 46 cannot flow back within the passage 32 but must seek its outlet through the port 44, as indicated by arrows 49. As shown by arrows 49 in Fig. 3, this water passes into the water chamber 40 and then through the circular passage formed by the water chamber 42 to the outlet chamber 41, as indicated by the arrow 50 from whence it is conducted through one of the tubular connections 39, as indicated by arrows 51, to the port 45, which connects with the passage 47 formed around the tube 46. For connection to the rightward end of the tube 46 and the rightward end of the passage 47, there is a swivel fitting 52 which is shown only schematically, for the reason that the details of construction do not form a part of the present invention. The swivel fitting 52 comprises a cylindrical body 53 which is fixed on the rightward end of the drum shaft 11 so that it will rotate therewith. The outer end of the tube 46 connects with a chamber 54 in the body 53, and the body 53 provides a chamber 55 which connects with the outer end of the passage 47. A non-rotatable shell 56 receives the body 53 and has therein chambers 57 and 58 which connect with the chambers 54 and 55. A water inlet tube 59 connects with the chamber 57 and the cooling water which is fed in through the tube 59 passes through the chamber 54 into the rightward end of the tube 46. The outlet flow of heated water from the brake drum passes from the passage 47 into the chamber 55 and thence through the chamber 58 to outlet piping 60.

The brake drum 61, Fig. 1, is symmetrical to the brake drum 35 and the means for cooling the same is a substantial duplicate of the water circulating means shown and described with relation to the right hand drum 35, the cooling water for the drum 61 being passed in and out of the leftward end of the drum shaft 11 by use of the swivel connection 18. It will be perceived that in the construction disclosed I have achieved a drum shaft assembly for a drawworks equipped for heavy duty drilling operation, with efficient cooling of both of the band type brakes and with the auxiliary power absorbing means represented by the hydromatic brake 16 for relieving the friction brakes when a pipe string is being run into the hole. The overall length of the drum shaft assembly is maintained at a minimum value for the number of cooperating parts employed.

I claim as my invention:

A hoisting mechanism of the general class described, having a drum and a fluid cooled brake for said drum, a shaft supporting said drum and a part of said brake, said shaft having a projecting end with splines adjacent the extremity thereof and a fluid duct means extending from said brake to the extremity of said projecting end, bearing means supporting said projecting end of said shaft and fluid conveying means at said extremity of said projecting end of said shaft connected to said duct means, in combination with: a fluid type brake device surrounding said projecting shaft end between said bearing means and said extremity, said device having a stator with an axial opening therethrough through which said projecting shaft end passes and a rotor also having an axial opening from end to end thereof through which said projecting shaft end passes, said rotor having a clutch element connected to the end thereof facing said extremity; a cooperating clutch element in sliding engagement with said splines of said projecting shaft end for clutching engagement with said first named clutch element; and means to move said last named clutch element along said splines into clutching engagement with said first named clutch element.

SAMUEL W. WEBSTER.